(12) United States Patent
Zhang et al.

(10) Patent No.: US 12,493,135 B2
(45) Date of Patent: Dec. 9, 2025

(54) VEHICLE-MOUNTED SECURITY INSPECTION SYSTEM

(71) Applicants: NUCTECH COMPANY LIMITED, Beijing (CN); Tsinghua University, Beijing (CN)

(72) Inventors: Li Zhang, Beijing (CN); Zhiqiang Chen, Beijing (CN); Yi Cheng, Beijing (CN); Qingping Huang, Beijing (CN); Mingzhi Hong, Beijing (CN); Lei Zheng, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 252 days.

(21) Appl. No.: 18/551,578

(22) PCT Filed: Jan. 25, 2022

(86) PCT No.: PCT/CN2022/073732
§ 371 (c)(1),
(2) Date: Sep. 20, 2023

(87) PCT Pub. No.: WO2022/206150
PCT Pub. Date: Oct. 6, 2022

(65) Prior Publication Data
US 2024/0176039 A1     May 30, 2024

(30) Foreign Application Priority Data
Mar. 30, 2021  (CN) .......................... 202110336765.2

(51) Int. Cl.
*G01V 5/22* (2024.01)
*B64F 1/36* (2024.01)
(Continued)

(52) U.S. Cl.
CPC ................ *G01V 5/226* (2024.01); *B64F 1/36* (2013.01); *G01N 23/04* (2013.01); *G01N 23/046* (2013.01);
(Continued)

(58) Field of Classification Search
CPC  B64F 1/36; G01N 2223/03; G01N 2223/101; G01N 2223/30; G01N 23/04;
(Continued)

(56) References Cited

FOREIGN PATENT DOCUMENTS

| CN | 1993269 A | 7/2007 |
|---|---|---|
| CN | 101602341 A | 12/2009 |

(Continued)

OTHER PUBLICATIONS

English translation of CN208399407U (Year: 2019).*
International Search Report issued in International Application No. PCT/CN2022/073732, mailed on Apr. 26, 2022.

*Primary Examiner* — Mark R Gaworecki
(74) *Attorney, Agent, or Firm* — Knobbe, Martens, Olson & Bear, LLP

(57) ABSTRACT

A vehicle-mounted security inspection system includes a mobile chassis. A first cabin provided on the mobile chassis includes an object security inspection apparatus, which is used to perform a security inspection on an object. A second cabin provided on the mobile chassis includes a human body security inspection apparatus which is used to perform a security inspection on a human body. The second cabin is flexibly connected to the first cabin, so that in a first state, the second cabin is located at one end of the first cabin in a longitudinal direction of the mobile chassis, and in a second state, the second cabin is located on one side of the first cabin in the longitudinal direction of the mobile chassis.

15 Claims, 13 Drawing Sheets

(51) Int. Cl.
   *G01N 23/02*   (2006.01)
   *G01S 13/88*   (2006.01)
   *G01V 5/226*   (2024.01)
   *G01N 23/04*   (2018.01)
   *G01N 23/046*   (2018.01)

(52) U.S. Cl.
   CPC ... *G01N 2223/03* (2013.01); *G01N 2223/101* (2013.01); *G01N 2223/30* (2013.01); *G01S 13/887* (2013.01); *G01V 5/22* (2024.01)

(58) Field of Classification Search
   CPC ...... G01N 23/046; G01S 13/887; G01V 5/22; G01V 5/226
   See application file for complete search history.

(56) References Cited

FOREIGN PATENT DOCUMENTS

| | | | |
|---|---|---|---|
| CN | 102749657 A | | 10/2012 |
| CN | 208399407 U | * | 1/2019 |
| CN | 111497724 A | | 8/2020 |
| CN | 112462446 A | | 3/2021 |
| CN | 112730472 A | | 4/2021 |
| CN | 112730475 A | | 4/2021 |
| WO | WO 2020/140977 A1 | | 7/2020 |

* cited by examiner

VEHICLE-MOUNTED SECURITY INSPECTION SYSTEM

CROSS REFERENCE TO RELATED APPLICATION(S)

This application claims priority to Chinese Patent Application No. 202110336765.2, filed on Mar. 30, 2021, the entire content of which is incorporated herein by reference in its entirety.

TECHNICAL FIELD

The present disclosure relates to the field of security inspection technology, and in particular to a vehicle-mounted security inspection system.

BACKGROUND

In recent years, there has been a gradual increase in large and medium-sized gatherings or events both domestically and internationally, in which the pedestrian density is high, and a duration of the gathering or event may be one day, one month, or even one year, thus the gathering or event may easily become a target of a terrorist attack, and once an accident occurs, the gathering or event may easily cause a major accident. Therefore, a requirement for security inspection is high. However, the existing vehicle-mounted security inspection system is commonly used for the large and medium-sized gatherings or events. However, the existing vehicle-mounted security inspection system cannot expand its usage space internally, resulting in a limited application of space inside the cabin. Therefore, the existing vehicle-mounted security inspection system cannot load more apparatuses, making it not cost-effective and greatly limiting the security inspection process. In addition, the human body security inspection apparatus on the existing vehicle-mounted security inspection system is located at a certain height from the ground, and inspected personnel need to step on a high ladder for inspection. Moreover, the existing human body security inspection apparatus occupies a large space.

SUMMARY

In response to the shortcoming of the existing method, the present disclosure proposes a vehicle-mounted security inspection system to solve at least one technical problem existing in the related art.

According to the present disclosure, a vehicle-mounted security inspection system is provided, including: a mobile chassis; a first cabin provided on the mobile chassis, an object security inspection apparatus is provided inside the first cabin, and the object security inspection apparatus is configured to perform a security inspection on an object; and a second cabin provided on the mobile chassis, a human body security inspection apparatus is provided inside the second cabin, and the human body security inspection apparatus is configured to perform a security inspection on a human body, the second cabin is flexibly connected to the first cabin, so that in a first state, the second cabin is located at one end of the first cabin in a longitudinal direction of the mobile chassis, and in a second state, the second cabin is located on one side of the first cabin in the longitudinal direction of the mobile chassis.

According to an exemplary embodiment of the present disclosure, the vehicle-mounted security inspection system further includes a rotating mechanism, the rotating mechanism is configured to rotate the second cabin with respect to the first cabin, so that in the first state, the second cabin is located at one end of the first cabin in the longitudinal direction of the mobile chassis, and in the second state, the second cabin is located on one side of the first cabin in the longitudinal direction of the mobile chassis.

According to an exemplary embodiment of the present disclosure, the vehicle-mounted security inspection system further includes a lifting mechanism, the lifting mechanism is configured to lift and drop the second cabin with respect to the first cabin in the second state.

According to an exemplary embodiment of the present disclosure, the number of the second cabin is two, and in the second state, the two second cabins are respectively located on two opposite sides of the first cabin in the longitudinal direction of the mobile chassis.

According to an exemplary embodiment of the present disclosure, in the first state, the second cabin is located at a rear end of the first cabin.

According to an exemplary embodiment of the present disclosure, the human body security inspection apparatus includes a human body inspection channel located inside the second cabin and a human body security inspection apparatus body located on at least one side of the human body inspection channel, and in the second state, an axial direction of the human body inspection channel is parallel to the longitudinal direction of the mobile chassis.

According to an exemplary embodiment of the present disclosure, the human body security inspection apparatus includes an unfolding mechanism configured to achieve a switch of the human body inspection channel between an unfolded state and a compressed state.

According to an exemplary embodiment of the present disclosure, in the first state, the second cabin is open or has an openable cabin door on a side close to the first cabin, and in the first state, the second cabin has an openable cabin door at a position corresponding to the human body inspection channel on a side away from the first cabin.

According to an exemplary embodiment of the present disclosure, the object security inspection apparatus includes an object conveying mechanism configured to convey an inspected object along the longitudinal direction of the mobile chassis.

According to an exemplary embodiment of the present disclosure, the object conveying mechanism includes a main body section located inside the first cabin, an inlet extension section and an outlet extension section located outside the first cabin, the inlet extension section is configured to receive the inspected object and transmit the inspected object into an object inspection channel, the main body section is configured to carry the inspected object through the object inspection channel, and the outlet extension section is configured to receive the inspected object from the object inspection channel and transmit the inspected object to a suitable position for the inspected object to be taken away.

According to an exemplary embodiment of the present disclosure, the object conveying mechanism includes a mechanical structure configured to achieve a switch, of the inlet extension section and the outlet extension section, between a horizontal position in a working state and a vertical position in a non-working state.

According to an exemplary embodiment of the present disclosure, the first cabin has an openable cabin door at a position corresponding to the object conveying mechanism at two ends in the longitudinal direction of the mobile chassis.

According to an exemplary embodiment of the present disclosure, the object security inspection apparatus is a CT security inspector.

According to an exemplary embodiment of the present disclosure, a towing connection device is provided at a front end of the mobile chassis.

According to an exemplary embodiment of the present disclosure, the vehicle-mounted security inspection system further includes a fixed support device configured to fix and support the mobile chassis at a fixed position.

BRIEF DESCRIPTION OF THE DRAWINGS

The above and/or additional aspects and advantages of the present disclosure will become apparent and easily understood through the following descriptions of embodiments in conjunction with the accompanying drawings, in which.

DETAILED DESCRIPTION OF EMBODIMENTS

Figure 1:
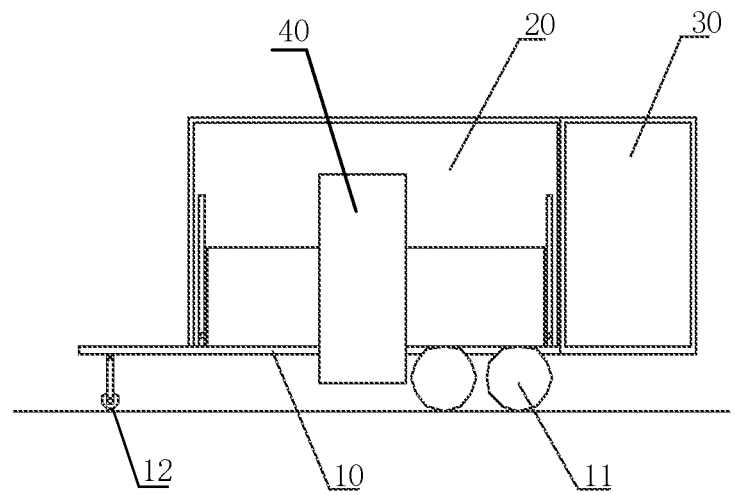
FIG. 1 shows a structural schematic diagram of a vehicle-mounted security inspection system according to an exemplary embodiment of the present disclosure in a first state.
Figure 2:
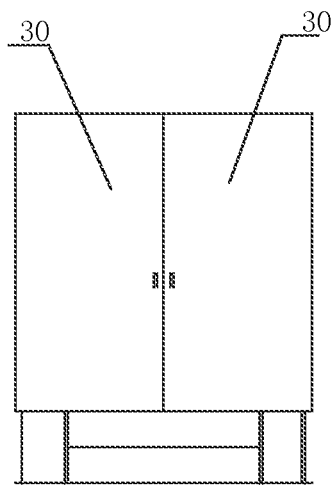
FIG. 2 shows a right view of the vehicle-mounted security inspection system shown in FIG. 1.
Figure 3:
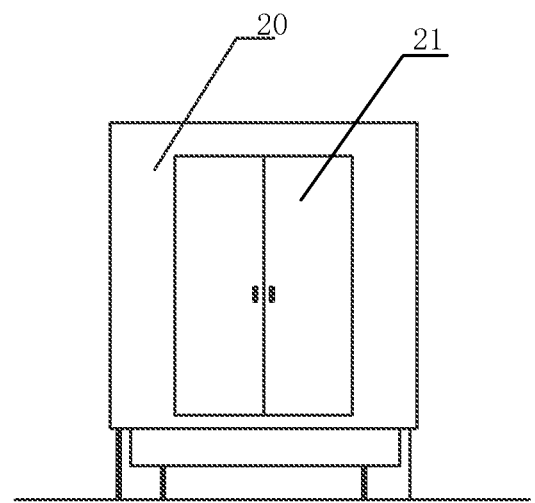
FIG. 3 shows a left view of the vehicle-mounted security inspection system shown in FIG. 1.

The present disclosure will be described in detail below, and exemplary embodiments and optional embodiments of the present disclosure are shown in the accompanying drawings. Throughout the present disclosure, the same or similar reference numerals represent the same or similar components or components with same or similar functions. Furthermore, if a detailed description of known technology is not necessary for features shown in the present disclosure, it will be omitted. The embodiments described below with reference to the accompanying drawings are exemplary, which are only used to explain the present disclosure and cannot be interpreted as limiting the present disclosure.

Those skilled in the art may understand that, unless otherwise defined, all terms used here (including technical and scientific terms) have the same meaning as those generally understood by those skilled in the art to which the present disclosure belongs. It should also be understood that terms such as those defined in general dictionaries should be understood to have meanings consistent with those in the context of related art, and unless specifically defined as such, they will not be interpreted using idealized or overly formal meanings.

Those skilled in the art may understand that, unless specifically stated, the singular forms "a", "one", "said", and "the" used here may also include plural forms. It should be further understood that the term "including" used in the specification of the present disclosure refers to a presence of the features, integers, steps, operations, elements and/or components, but does not exclude a presence or addition of one or more other features, integers, steps, operations, elements, components, and/or a combination thereof.

According to a general inventive concept of the present disclosure, a vehicle-mounted security inspection system is provided, including: a mobile chassis; a first cabin provided on the mobile chassis, an object security inspection apparatus is provided inside the first cabin, and the object security inspection apparatus is used to perform a security inspection on an object; and a second cabin provided on the mobile chassis, a human body security inspection apparatus is provided inside the second cabin, and the human body security inspection apparatus is used to perform a security inspection on a human body; the second cabin is flexibly connected to the first cabin, so that in a first state, the second cabin is located at one end of the first cabin in a longitudinal direction of the mobile chassis, and in a second state, the second cabin is located on one side of the first cabin in the longitudinal direction of the mobile chassis.

As shown in FIG. 1 to FIG. 5, a vehicle-mounted security inspection system provided by an exemplary embodiment of the present disclosure includes: a mobile chassis 10, a first cabin 20 and two second cabins 30. The first cabin 20 is provided on the mobile chassis 10. An object security inspection apparatus 40 is provided inside the first cabin 20, and the object security inspection apparatus 40 is used to perform a security inspection on an object. The second cabin 30 is provided on the mobile chassis 10. A human body security inspection apparatus 50 is provided inside the second cabin 30, and the human body security inspection apparatus 50 is used to perform a security inspection on a human body. The two second cabins 30 are flexibly connected to a rear end of the first cabin 20, so that in a first state (i.e., a non-working state), the two second cabins 30 are located at a rear end of the first cabin 20 in a longitudinal direction of the mobile chassis 10, and in a second state (i.e., a working state), the two second cabins 30 are located on two opposite sides of the first cabin 20 in the longitudinal direction of the mobile chassis 10.

In the vehicle-mounted security inspection system provided by the embodiment of the present disclosure, the second cabin 30 is rotatably connected to the first cabin 20, so that in the first state, the second cabin 30 is located at the rear end of the first cabin 20 in the longitudinal direction of the mobile chassis 10. This may transfer the space at the rear of the vehicle body to two sides of the mobile chassis 10, namely two opposite sides of the first cabin 20, thereby saving a rear space while expanding an inspection channel, so that the vehicle-mounted security inspection system may carry more security inspection apparatuses.

It should be noted that although two second cabins 30 are presented in the embodiment shown in FIG. 1, the number of second cabins 30 may also be four, one, or three, etc., according to actual needs. For example, when using one second cabin 30, the second cabin 30 may be provided at a front end or the rear end of the mobile chassis 10. When using four second cabins 30, two second cabins 30 may be provided in parallel at the front end of the mobile chassis 10, while other two second cabins 30 are provided in parallel at the rear end of the mobile chassis 10. In addition, although the two second cabins 30 in the embodiment shown in FIG. 1 move from the rear end of the mobile chassis to the two opposite sides of the mobile chassis, other methods may also be used in other embodiments of the present disclosure, such as rotating from a top of the first cabin to one side of the mobile chassis, or translating from the rear end of the first cabin to one side of the mobile chassis along a transverse direction of the mobile chassis.

Figure 13:
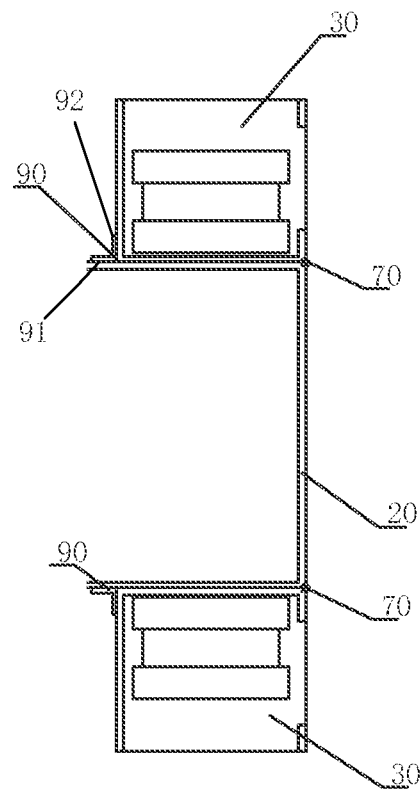
FIG. 13 shows a schematic local diagram of a vehicle-mounted security inspection system according to an exemplary embodiment of the present disclosure.

In an exemplary embodiment of the present disclosure, as shown in FIG. 13, the vehicle-mounted security inspection system further includes a rotating mechanism 70. The rotating mechanism 70 is used to rotate the second cabin 30 with respect to the first cabin 20, so that in the first state (i.e., the non-working state), the second cabin 30 is located at the rear end of the first cabin 20, and in the second state (i.e., the working state), the second cabin 30 is located on one side of the first cabin 20.

In an exemplary embodiment of the present disclosure, as shown in FIG. 13, the rotating mechanism 70 is a bearing. It should be noted that in some other embodiments of the present disclosure, alternative devices known or applicable in the art may also be used as the rotating mechanism.

In an exemplary embodiment of the present disclosure, as shown in FIG. 13, the vehicle-mounted security inspection system further includes a fixing device 90. The fixing device 90 is used to keep the second cabin 30 fixed with respect to the first cabin 20 in a direction of rotation in the second state.

In an exemplary embodiment of the present disclosure, as shown in FIG. 13, the fixing device 90 includes a first connector. The first connector includes a first part 91 and a second part 92 substantially perpendicular to the first part 91. The second part 92 is used to connect with the second cabin 30. The first part 91 is detachably connected to the first cabin 20 through a bolt, for example, to prevent the second cabin 30 from rotating with respect to the first cabin 20.

It should be noted that in some other embodiments of the present disclosure, alternative devices known or applicable in the art may also be used as the fixing device 90. For example, the second part 92 of the first connector may be rotatably connected to the second cabin 30 around an axis of the second part 92. The second cabin 30 is provided with a receiving part protruding outwardly, which is used to receive the first part 91 of the first connector. When it is desired to fix the second cabin 30 with the first cabin 20, the second part 92 of the first connector is rotated around its axis so that the first part 91 of the first connector is located in the receiving part on the first cabin 20. When it is desired to release the second cabin 30, the second part 92 of the first connector is rotated back to its initial position around its axis.

Figure 8:
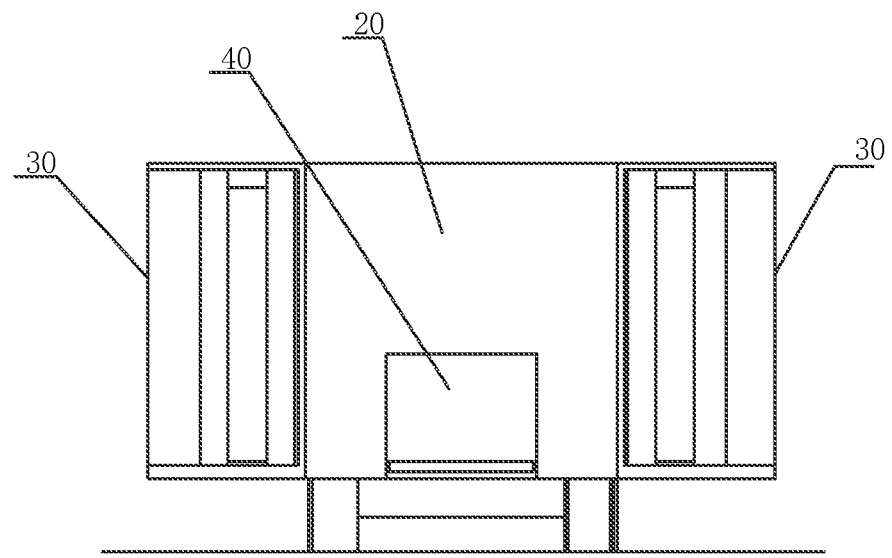
FIG. 8 shows a schematic diagram of a vehicle-mounted security inspection system according to an exemplary embodiment of the present disclosure, in which a second cabin is not lowered.
Figure 15:
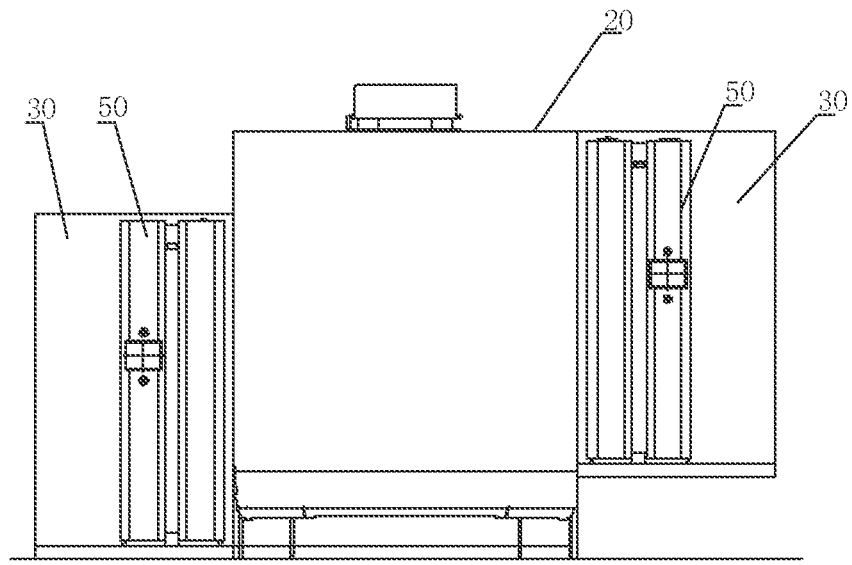
FIG. 15 shows a schematic structural diagram of a vehicle-mounted security inspection system according to an exemplary embodiment of the present disclosure, in which one second cabin is lowered while a position of another second cabin remains stationary.
Figure 16:
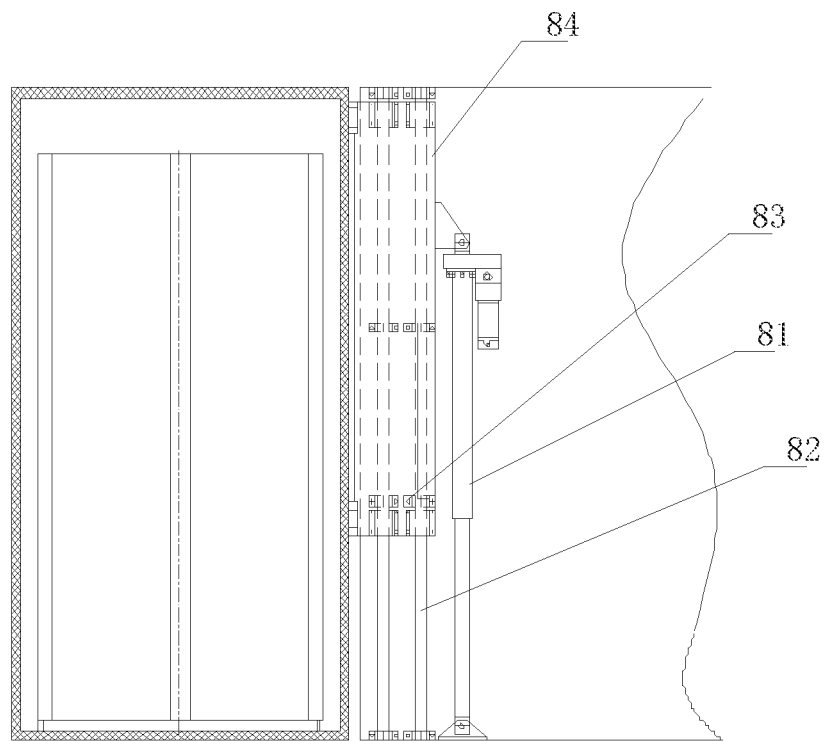
FIG. 16 shows a schematic diagram of a lifting mechanism of a vehicle-mounted security inspection system according to an exemplary embodiment of the present disclosure.
Figure 17:
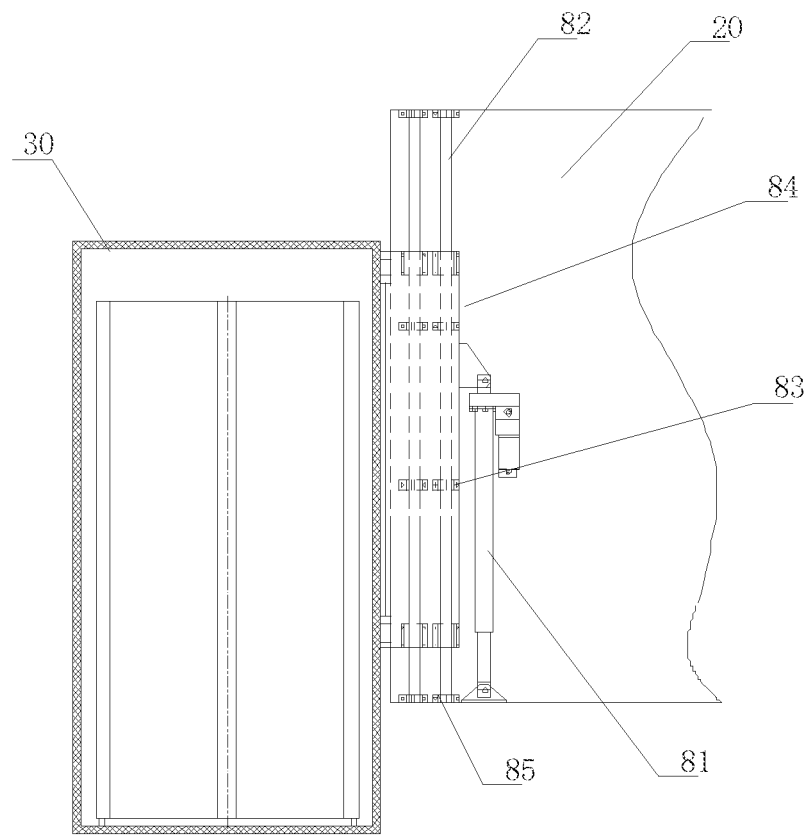
FIG. 17 shows another schematic diagram of a lifting mechanism of a vehicle-mounted security inspection system according to an exemplary embodiment of the present disclosure.
Figure 18:
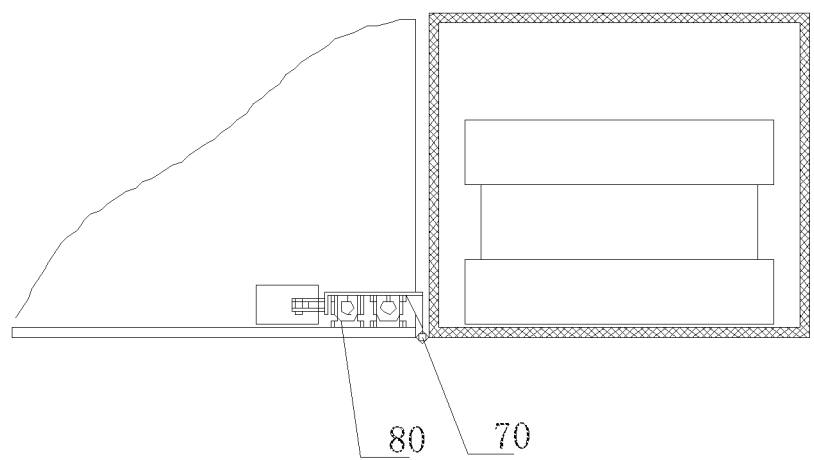
FIG. 18 shows a top view of a lifting mechanism of a vehicle-mounted security inspection system according to another exemplary embodiment of the present disclosure, in which the vehicle-mounted security inspection system is in a first state.

In an exemplary embodiment of the present disclosure, as shown in FIG. 15 to FIG. 23, the vehicle-mounted security inspection system further includes a lifting mechanism 80. The lifting mechanism 80 is used to lift and drop the human body security inspection apparatus 50 in the second cabin 30 with respect to the first cabin 20 in the second state (as shown in FIG. 8), for example, lowering to the ground. In this way, the need for the inspected personnel to climb high when the human body security inspection apparatus 50 is high above the ground may be avoided, or a ladder made for the human body security inspection apparatus 50 may be omitted, thus reducing costs and improving safety. In an exemplary embodiment of the present disclosure, as shown in FIG. 15, the lifting mechanisms 80 respectively for two second cabins 30 are independently controlled.

In an exemplary embodiment of the present disclosure, as shown in FIG. 16 to FIG. 19, the lifting mechanism 80 includes a first assembly and a second assembly. The first assembly includes a shaft 82 which is provided inside the first cabin 20 and extends in a vertical direction. Two opposite ends of the shaft 82 are connected to the first cabin 20 through a base 85. The second assembly includes a slider 83 slidably connected to the shaft 82, the slider 83 is connected to the second cabin 30. The lifting mechanism 80 drives the second cabin 30 to lift and drop with respect to the first cabin 20 by sliding the slider 83 with respect to the shaft 82, thereby driving the human body security inspection apparatus 50 to lift and drop with respect to the second cabin 30.

Figure 19:
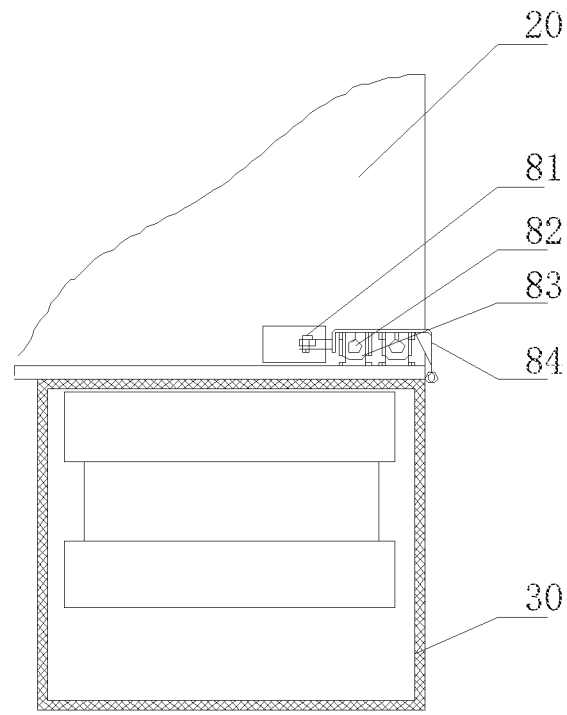
FIG. 19 shows a local top view of the lifting mechanism of the vehicle-mounted security inspection system shown in FIG. 18, in which the vehicle-mounted security inspection system is in a second state.
Figure 20:
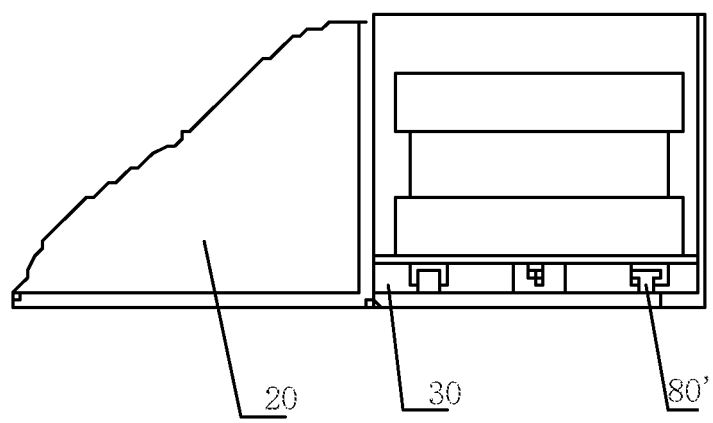
FIG. 20 shows a top view of a lifting mechanism of a vehicle-mounted security inspection system according to another exemplary embodiment of the present disclosure, in which the vehicle-mounted security inspection system is in a first state.
Figure 21:
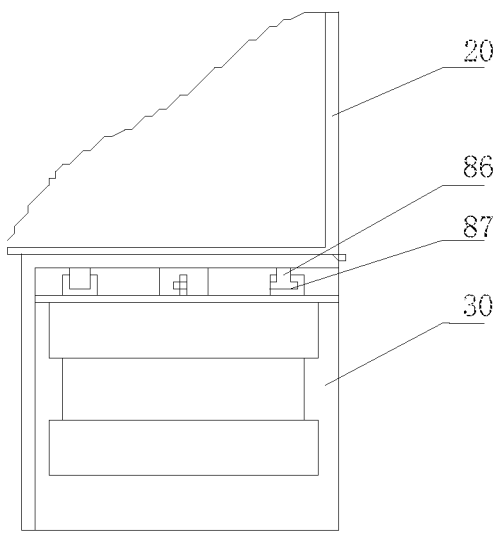
FIG. 21 shows a local top view of the lifting mechanism of the vehicle-mounted security inspection system shown in FIG. 20, in which the vehicle-mounted security inspection system is in a second state.
Figure 22:
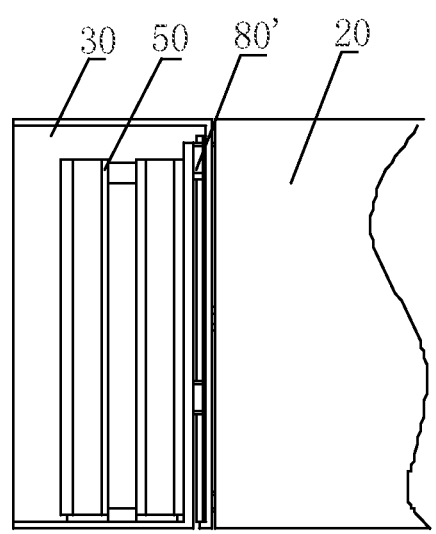
FIG. 22 shows a right view of the lifting mechanism of the vehicle-mounted security inspection system shown in FIG. 21, in which a human body security inspection apparatus is not lowered.
Figure 23:
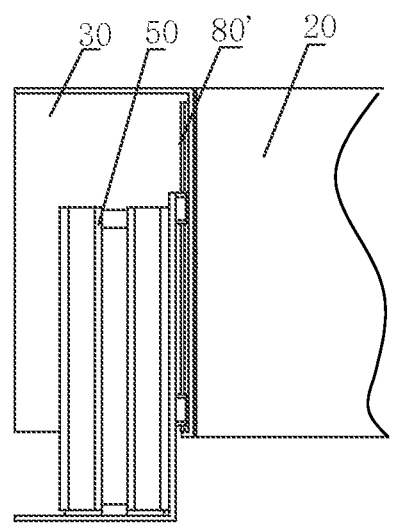
FIG. 23 shows a right view of the lifting mechanism of the vehicle-mounted security inspection system shown in FIG. 21, in which a human body security inspection apparatus is lowered.

In an exemplary embodiment of the present disclosure, as shown in FIG. 19, the second assembly further includes a second connector 84 connected to the slider 83, and the second cabin 30 is rotatably connected to the second connector 84.

In an exemplary embodiment of the present disclosure, as shown in FIG. 19, the second connector 84 is a U-shaped connecting plate. The shaft 82 is provided in a concave portion of the U-shaped connecting plate.

In an exemplary embodiment of the present disclosure, as shown in FIG. 19, there are a plurality of shafts 82. Axes of the plurality of shafts 82 are located in a plane parallel to a plane where a base of the U-shaped connecting plate is located. The slider corresponding to each shaft 82 is connected to the base of the U-shaped connecting plate.

In an exemplary embodiment of the present disclosure, as shown in FIG. 19, the lifting mechanism 80 further includes a driving device used to drive the lifting mechanism 80 to work, such as a linear actuator, etc.

In another exemplary embodiment of the present disclosure, as shown in FIG. 20 to FIG. 23, the first assembly of a lifting mechanism 80' includes a slide rail 86, which is provided on one of an inner sidewall of the second cabin 30 and the human body security inspection apparatus 50. The second assembly of the lifting mechanism 80 includes a slide channel 87 dynamically connected to the slide rail 86, the slide channel is provided on the other of the inner sidewall of the second cabin 30 and the human body security inspection apparatus 50. A bottom wall of the second cabin 30 is provided with an outlet for the human body security inspection apparatus 50 to slide out.

It should be noted that in some other embodiments of the present disclosure, in a case of providing the lifting mechanism 80, the fixing device 90 may also be directly detachably connected to the lifting mechanism 80 to keep the second cabin 30 fixed with respect to the first cabin 20 in the direction of rotation, and to enable the second cabin 30 to be lifted and dropped under the driving of the lifting mechanism 80. Specifically, the lifting mechanism 80 is provided with a receiving part protruding outwardly, which is used to receive the first part 91 of the first connector. When it is desired to keep the second cabin 30 fixed, the second part 92 of the first connector is rotated around its axis so that the first part 91 of the first connector is located in the receiving part on the lifting mechanism 80. When it is desired to release the second cabin 30, the second part 92 of the first connector is rotated back to its initial position around its axis.

Figure 4:
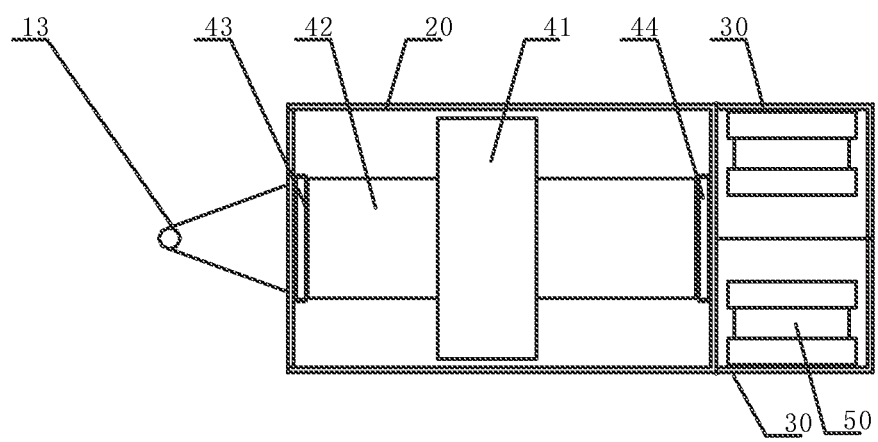
FIG. 4 shows a top perspective view of the vehicle-mounted security inspection system shown in FIG. 1.

In an exemplary embodiment of the present disclosure, as shown in FIG. 4, a front end of the mobile chassis 10 is provided with a towing connection device 13. The vehicle-mounted security inspection system may conveniently transport the mobile chassis 10 and the apparatus on the mobile chassis 10 by providing the towing connection device 13, and may not be affected by an upgrading of vehicle emissions and different left and right rudder driving in different countries. If long-term parking is required, maintenance is not required.

Figure 11:
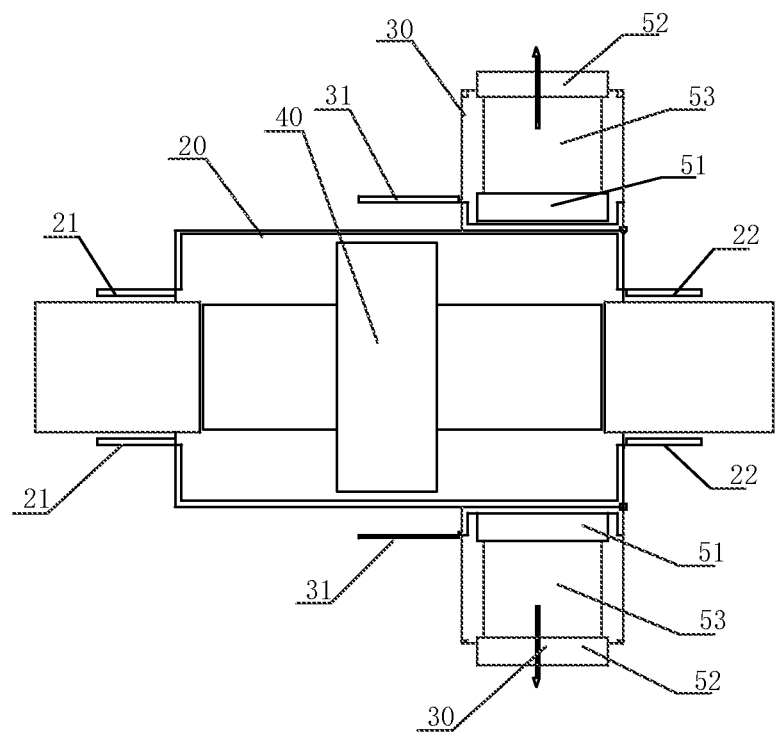
FIG. 11 shows another top perspective view of a vehicle-mounted security inspection system according to an exemplary embodiment of the present disclosure, in which a human body security inspection apparatus is in an unfolded state.
Figure 12:
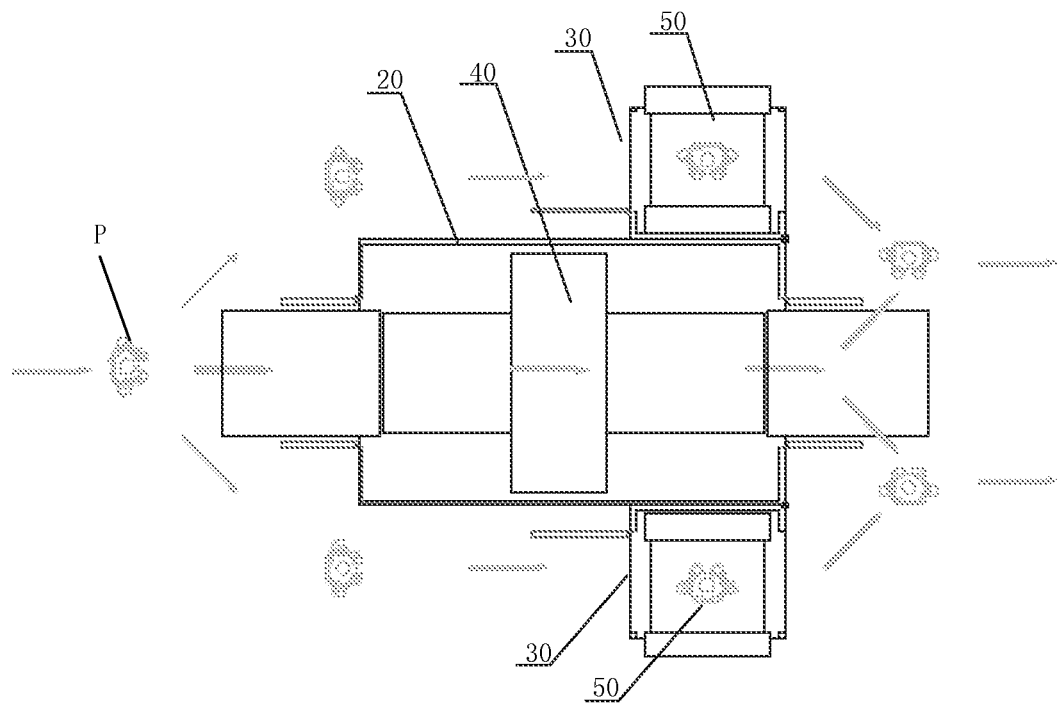
FIG. 12 shows a top perspective view of a vehicle-mounted security inspection system according to an exemplary embodiment of the present disclosure, while an operational process of the system is further disclosed.

In an exemplary embodiment of the present disclosure, as shown in FIG. 11 and FIG. 12, the human body security inspection apparatus 50 includes a human body inspection channel 53 located in the second cabin 30 and a human body security inspection apparatus body located on at least one side of the human body inspection channel 53. In the second state, an axial direction of the human body inspection channel 53 is parallel to the longitudinal direction of the mobile chassis 10. A millimeter-wave human body security inspection apparatus or a terahertz-wave human body security inspection apparatus, etc. may be used as the human body security inspection apparatus body.

Figure 24:
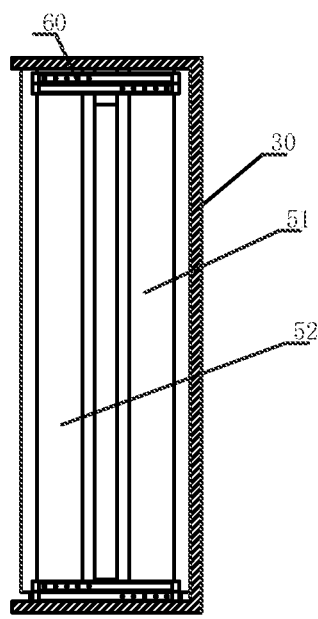
FIG. 24 shows a schematic diagram of a human body security inspection apparatus of a vehicle-mounted security inspection system according to an exemplary embodiment of the present disclosure, in which a human body security inspection apparatus is in a compressed state.
Figure 25:
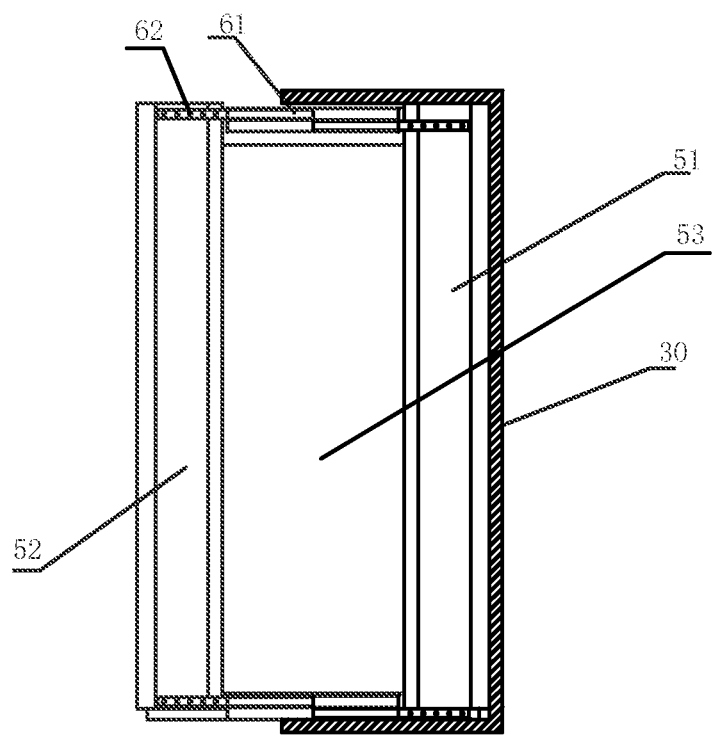
FIG. 25 shows a schematic diagram of a human body security inspection device of a vehicle-mounted security inspection system according to an exemplary embodiment of the present disclosure, in which the human body security inspection apparatus is in an unfolded state.

In an exemplary embodiment of the present disclosure, as shown in FIG. 24 and FIG. 25, the human body security inspection apparatus 50 includes an unfolding mechanism 60 used to achieve a switch between an unfolded state and a compressed state of the human body inspection channel 53. In this way, for example, when the human body security inspection apparatus 50 is in the non-working state, such as when the vehicle-mounted security inspection system is transporting, the human body inspection channel 53 is compressed through the unfolding mechanism 60, which may reduce a space occupied by the human body inspection channel 53 (as shown in FIG. 24). In contrast, when the human body security inspection apparatus 50 is in the working state, the human body inspection channel 53 is unfolded to a normal size (as shown in FIG. 25) through the unfolding mechanism 60 for the inspected personnel to pass through. The vehicle-mounted security inspection system may further reduce the space occupied by human body security inspection apparatus 50 by providing the unfolding mechanism 60. For example, a size of the human body security inspection apparatus 50 may be reduced to nearly half that of a traditional human body security inspection apparatus.

In an exemplary embodiment of the present disclosure, as shown in FIG. 24 and FIG. 25, a first part 51 of the human body security inspection apparatus 50 is located on a first side of the human body inspection channel 53 in the unfolded state, and a second part 52 of the human body security inspection apparatus 50 is located on a second side of the human body inspection channel 53 opposite to the first side in the unfolded state. The unfolding mechanism 60 includes a first member 61 and a second member 62. The first member 61 is connected to the first part 51, and the second member 62 is connected to the second part 52. The second member 62 may move horizontally with respect to the first member 61 to unfold the human body inspection channel 53 (such as forming the human body inspection channel 53 that allows the inspected personnel to pass through) or compress the human body inspection channel 53 (such as causing the second part 52 to lean on the first part 51).

In an exemplary embodiment of the present disclosure, as shown in FIG. 24 and FIG. 25, the unfolding mechanism 60 may be a slide rail, preferably a heavy-duty slide rail. It should be noted that other unfolding mechanisms, such as a piston cylinder, may also be used in some other embodiments of the present disclosure.

In an exemplary embodiment of the present disclosure, as shown in FIG. 24 and FIG. 25, the first part 51 and the second part 52 of the human body inspection channel 53 are both provided with the human body security inspection apparatus body, so that when the inspected personnel pass through the human body security inspection apparatus 50 of the vehicle-mounted security inspection system, they may be scanned one time without turning 180°, thereby improving a security inspection pass rate and saving a security inspection time. It should be noted that in some other embodiments of the present disclosure, the human body security inspection device body may also be provided only on one side of the human body inspection channel 53, for example, on a side close to the first cabin 20 in the second state, i.e., the first part 51.

In an exemplary embodiment of the present disclosure, as shown in FIG. 24 and FIG. 25, the second cabin 30 is open on a side (i.e. a side away from the first cabin 20 in the second state) in an unfolding direction of the human body inspection channel 53, so as to allow the human body security inspection apparatus 50 to protrude from the second cabin 30 in the unfolded state. When the human body security inspection apparatus is not working, the human body inspection apparatus 53 may be compressed to allow the entire human body security inspection apparatus to retract back into the second cabin 30. In some other embodiments of the present disclosure, the second cabin 30 may not open on the side (i.e., the side away from the first cabin 20 in the second state) in the unfolding direction of the human body inspection channel 53, but may have an openable cabin door, so that the human body security inspection apparatus 50 protrudes from the second cabin 30 when the cabin door is opened.

In an exemplary embodiment of the present disclosure, as shown in FIG. 24 and FIG. 25, the unfolding mechanism 60 includes an upper unfolding mechanism and a lower unfolding mechanism. The upper unfolding mechanism is disposed at the top of the human body security inspection apparatus 50, and the lower unfolding mechanism is disposed at the bottom of the human body security inspection apparatus 50. It should be noted that in some other embodiments of the present disclosure, alternative devices known or applicable in the art may also be used as the unfolding mechanism.

In an exemplary embodiment of the present disclosure, the unfolding mechanism 60 further includes a driving device used to drive the unfolding mechanism 60 to work. In addition, the unfolding mechanism 60 may further include a locking device that fixes the second member with respective to the first member in the unfolded and compressed states, respectively.

Figure 10:
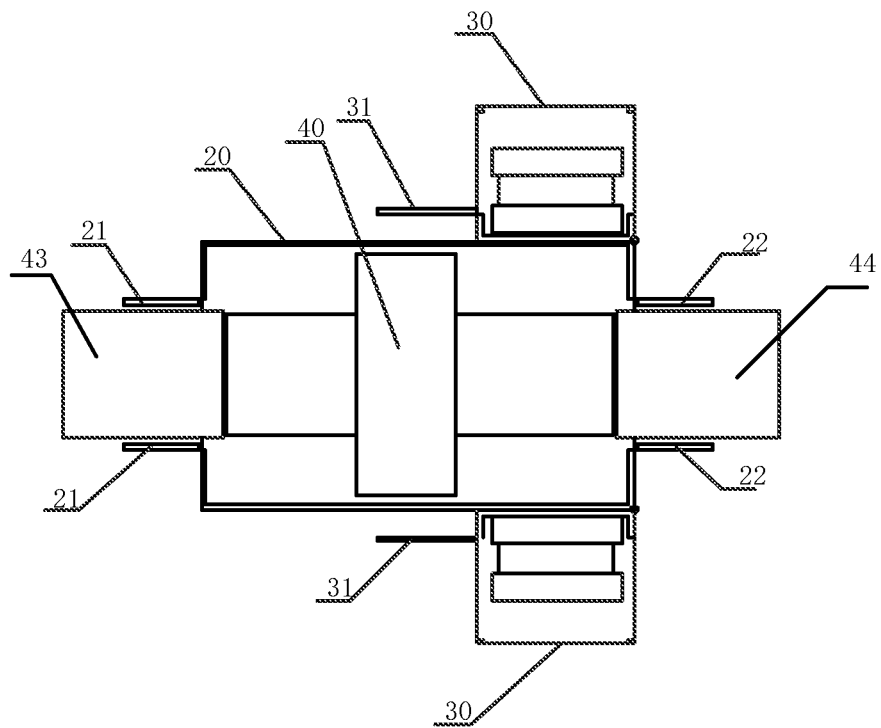
FIG. 10 shows a top perspective view of a vehicle-mounted security inspection system according to an exemplary embodiment of the present disclosure, in which a human body security inspection apparatus is in a compressed state.

In an exemplary embodiment of the present disclosure, as shown in FIG. 10, the second cabin 30 is open on a side close to the first cabin 20 in the first state. The second cabin 30 has an openable cabin door 31 at a position corresponding to the human body inspection channel 53 on a side away from the first cabin 20 in the first state. In some other embodiments of the present disclosure, the second cabin 30 may not be open on the side close to the first cabin 20 in the first state, but may have an openable cabin door. Therefore, as shown in FIG. 12, when the human body security inspection apparatus 50 is working, the inspected personnel enter from the cabin door 31 of the second cabin 30 and exit from a side opposite to the cabin door 31.

In an exemplary embodiment of the present disclosure, as shown in FIG. 10 and FIG. 11, the object security inspection apparatus 40 includes an object conveying mechanism and a CT security inspector 41. The object conveying mechanism is used to transport the inspected object along the longitudinal direction of the mobile chassis 10, such as from the front end of the mobile chassis to the rear end of the mobile chassis, from the rear end of the mobile chassis to the front end of the mobile chassis, or both. Specifically, in the embodiment, the object conveying mechanism includes a main body section 42 located inside the first cabin 20, an inlet extension section 43 and an outlet extension section 44 located outside the first cabin 20. The inlet extension section 43 is used to receive the inspected object and transmit the inspected object into an object inspection channel. The main body section 42 is used to carry the inspected object through the object inspection channel. The outlet extension section 44 is used to receive the inspected object from the object inspection channel and transmit the inspected object to a suitable position for the inspected object to be taken away.

Figure 7:
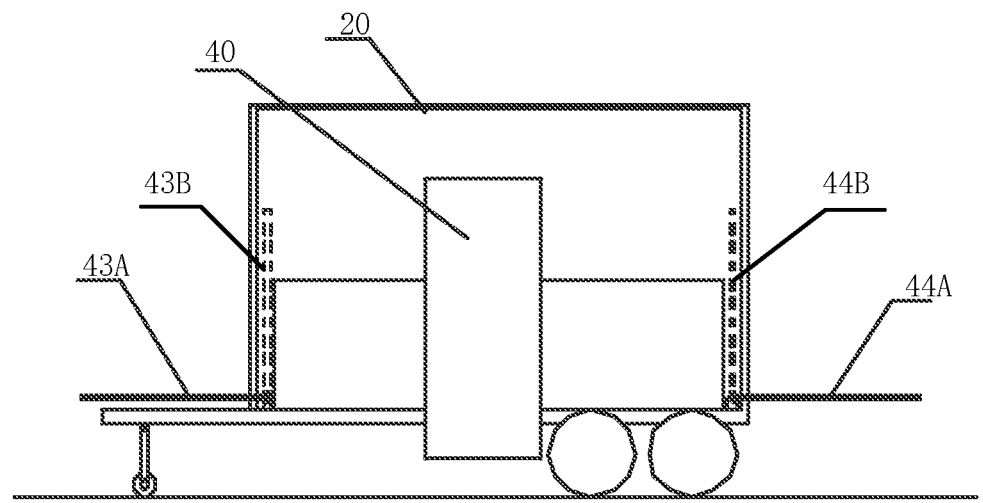
FIG. 7 shows a schematic diagram of an object conveying mechanism of a vehicle-mounted security inspection system according to an exemplary embodiment of the present disclosure.

In an exemplary embodiment of the present disclosure, as shown in FIG. 7, the object conveying mechanism includes a mechanical structure used to achieve a switch, of the inlet extension section 43 and the outlet extension section 44, between a horizontal position in the working state and a vertical position in the non-working state. In this way, the inlet extension section and the outlet extension section may be unfolded horizontally in the working state, and may be folded up in the non-working state to reduce the occupied space. In FIG. 7, 43A represents a position state of the inlet extension section 43 in the working state, while 43B represents a folding state of the inlet extension section 43 in the non-working state. 44A represents a position state of the outlet extension section 44 in the working state, while 44B represents a vertical folding state of the outlet extension section 44 in the non-working state. The state switching may be manually completed through a mechanical device or automatically completed through an electric device under button control.

Figure 6:
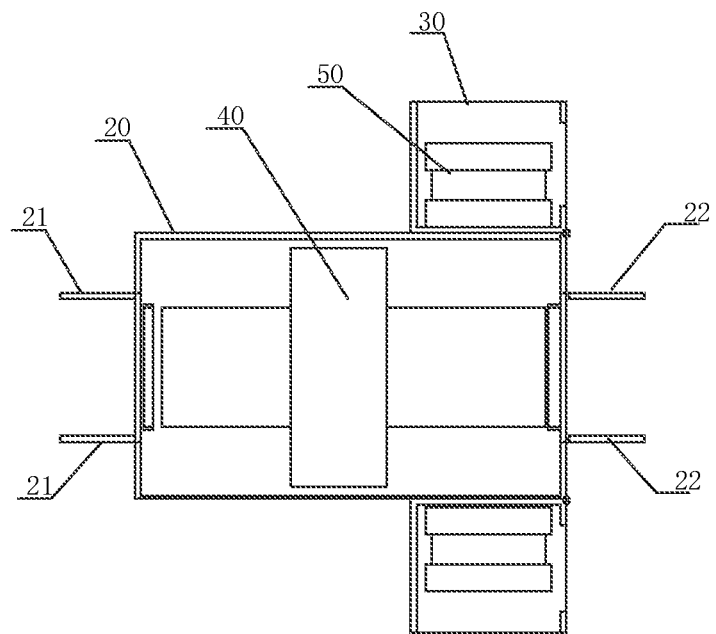
FIG. 6 shows another top perspective view of the vehicle-mounted security inspection system shown in FIG. 5, in which a cabin door of a first cabin is opened.

In an exemplary embodiment of the present disclosure, as shown in FIG. 6 and FIG. 11, the first cabin 20 has openable cabin doors (21, 22) at positions corresponding to the object conveying mechanism at two ends (i.e. the front end and the rear end) in the longitudinal direction of the first cabin 20, so that the inspected object, for example, enters from the front end of the first cabin 20 and exits from the rear end of the first cabin 20.

It should be noted that, although the CT security inspector 41 is used to perform inspection on the object in this embodiment so as to improve an inspection accuracy, alternative devices known or applicable in the art may also be used as the CT security inspector 41 in some other embodiments of the present disclosure.

In an exemplary embodiment of the present disclosure, as shown in FIG. 1, the mobile chassis 10 includes a mobile wheel 11 fixed below the chassis. The mobile wheel has a front wheel set and a rear wheel set, such as two front wheels as the front wheel set and two rear wheels as the rear wheel set.

In an exemplary embodiment of the present disclosure, as shown in FIG. 1, a fixed support device 12 is further included, which is used to assist or replace the front and rear wheel sets to provide a support for the mobile chassis 10 when the apparatus is in a fixed position and needs to be parked for a long time. Specifically, the fixed support device 12 may be an automatic or manual spiral lifting pillar.

In an exemplary embodiment of the present disclosure, as shown in FIG. 1, the mobile chassis 10 further includes, for example, a steering device, a braking device, etc. The steering device is used to cause the mobile wheel easy to change a direction during a movement of the mobile wheel, which increases a flexibility of a position movement of the vehicle-mounted security inspection system within a small range. The braking device is used to brake the mobile wheel, which may prevent a speed of the vehicle-mounted security inspection system from losing control during the movement, and may also be used to fix the vehicle-mounted security inspection system in a certain position when the vehicle-mounted security inspection system is stationary.

Figure 5:
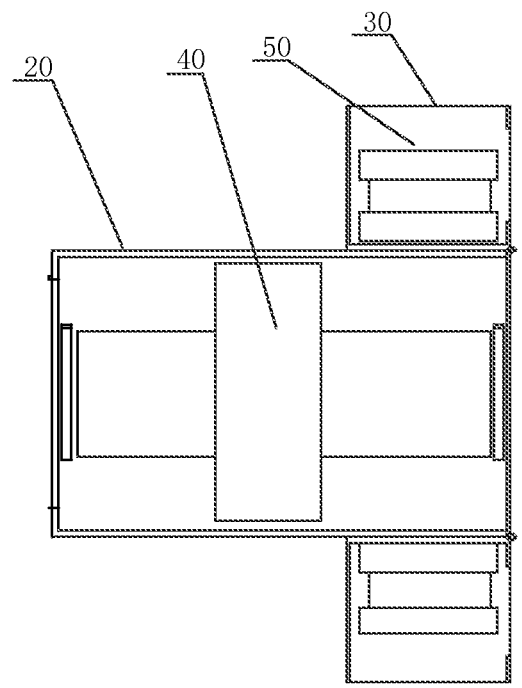
FIG. 5 shows a top perspective view of a vehicle-mounted security inspection system according to an exemplary embodiment of the present disclosure in a second state.
Figure 9:
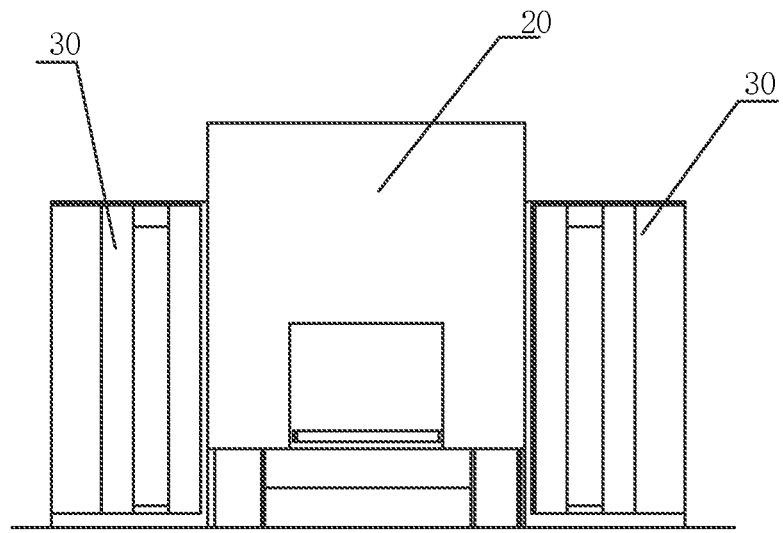
FIG. 9 shows a schematic diagram of a vehicle-mounted security inspection system according to an exemplary embodiment of the present disclosure, in which a second cabin is lowered.
Figure 14:
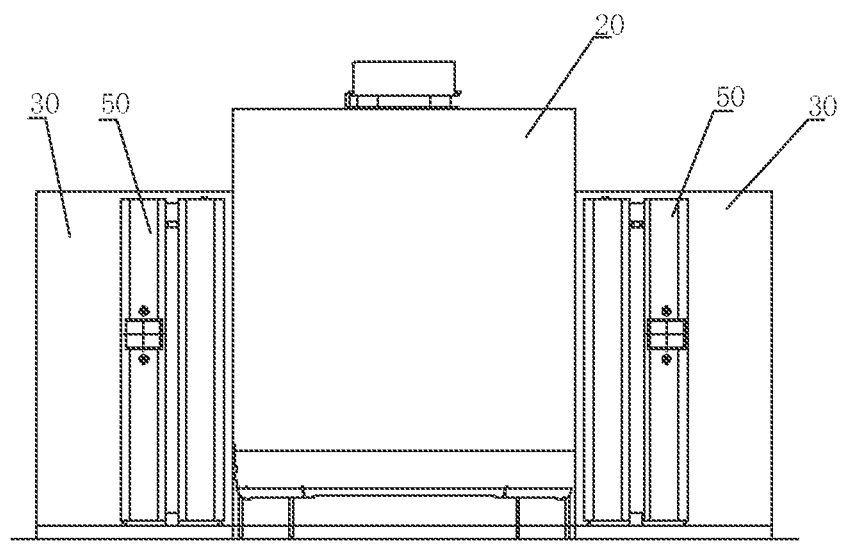
FIG. 14 shows a schematic structural diagram of a vehicle-mounted security inspection system according to an exemplary embodiment of the present disclosure, in which a second cabin is lowered.

When in use, the second cabin 30 is firstly rotated to one side of the first cabin 20 (as shown in FIG. 5), then the second cabin 30 is lowered to the ground with respect to the first cabin 20 through the lifting mechanism 80 (as shown in FIG. 9 and FIG. 14), then the human body inspection channel 53 is unfolded through the unfolding mechanism 60, then the cabin doors (21, 22) are opened and the inlet extension section 43 and the outlet extension section 44 of the object conveying mechanism are put in the working state (as shown in FIG. 11). As shown in FIG. 12, for example, when an inspected person P reaches the front end of the mobile chassis 10, an inspected object (such as a package) that is carried at any time may be placed at the inlet extension section 43 of the object conveying mechanism of the object security inspection apparatus 40. Then, the inspected person P enters the human body inspection channel 53 and receives the human body security inspection by the human body security inspection apparatus 50. At the same time, the inspected object is transported to the object security inspection apparatus 40 via the object conveying mechanism for object security inspection. When the inspected person P completes the human body security inspection and reaches the rear end of the mobile chassis 10, the inspected object is transported to the outlet extension section 44 of the object security inspection apparatus 40 via the object conveying mechanism, and the inspected person P may retrieve the inspected object in a timely manner.

In the vehicle-mounted security inspection system provided in the embodiments of the present disclosure, the second cabin is flexibly connected to the first cabin, so that two second cabins are located at the rear end of the first cabin in the longitudinal direction of the mobile chassis in the first state. This may transfer the space at the rear of the vehicle body to the two sides of the mobile chassis, thereby saving the rear space of the vehicle body and expanding the inspection channel, so that the vehicle-mounted security inspection system may carry more security inspection apparatuses. In addition, through a reasonable configuration of the human body security inspection apparatus and the object security inspection apparatus in physical space, it is possible to perform object security inspection on the inspected object carried by the inspected personnel while the inspected personnel enter and exit the human body security inspection apparatus for human body security inspection, making it easier for the inspected personnel to undergo both human body and object security inspections, thereby improving the security inspection efficiency. The vehicle-mounted security inspection system has characteristics of flexibility, short deployment time, and fast readiness, which may meet the needs of various large and medium-sized gatherings or events. At the same time, the vehicle-mounted security inspection system has a broad application prospect in a series of security inspection markets such as security guarantee, public security drug control, public security counter-terrorism, civil aviation, and customs inspection.

It should be noted that, although the vehicle-mounted security inspection system provided in the exemplary embodiment of the present disclosure is described above in conjunction with the accompanying drawings, the vehicle-mounted security inspection system provided in the present disclosure may flexibly adopt various alternative solutions according to actual situations and needs.

In the descriptions of the present disclosure, it should be understood that the terms such as "center", "up", "down", "front", "back" "left", "right", "vertical", "horizontal", "top", "bottom", "inside", "outside", and other orientation or positional relationships are based on the orientation or positional relationships shown in the accompanying drawings, which are only for the convenience of describing the present disclosure and simplifying the description instead of indicating or implying that the device or element referred to must have a specific orientation and must be constructed and operated in a specific orientation, and therefore cannot be understood as a limitation of the present disclosure.

The terms "first" and "second" are only used to describe the purpose and cannot be understood as indicating or implying relative importance or implying the quantity of technical features indicated. Therefore, features limited to "first" and "second" may explicitly or implicitly include one or more of these features. In the descriptions of the present disclosure, "a plurality of" means two or more unless otherwise stated.

The exemplary embodiments and optional embodiments of the present disclosure are only illustrative explanations of solutions of the present disclosure and the effects of the present disclosure, which are not intended to limit the present disclosure. Those skilled in the art should understand that without departing from the spirit and scope of the present disclosure, any changes and improvements made to the present disclosure are within the scope of the present disclosure. The protection scope of the present disclosure shall be based on the claims defined in the present disclosure.

What is claimed is:

1. A vehicle-mounted security inspection system, comprising:
    a mobile chassis;
    a first cabin provided on the mobile chassis, wherein an object security inspection apparatus is provided inside the first cabin, and the object security inspection apparatus is configured to perform a security inspection on an object; and
    a second cabin provided on the mobile chassis, wherein a human body security inspection apparatus is provided inside the second cabin, and the human body security inspection apparatus is configured to perform a security inspection on a human body,
    wherein the second cabin is flexibly connected to the first cabin, so that in a first state, the second cabin is located at one end of the first cabin in a longitudinal direction of the mobile chassis, and in a second state, the second cabin is located on one side of the first cabin in the longitudinal direction of the mobile chassis.

2. The vehicle-mounted security inspection system according to claim 1, further comprising a rotating mechanism, wherein the rotating mechanism is configured to rotate the second cabin with respect to the first cabin, so that in the first state, the second cabin is located at one end of the first cabin in the longitudinal direction of the mobile chassis, and in the second state, the second cabin is located on one side of the first cabin in the longitudinal direction of the mobile chassis.

3. The vehicle-mounted security inspection system according to claim 1, further comprising a lifting mechanism, wherein the lifting mechanism is configured to lift and drop the second cabin with respect to the first cabin in the second state.

4. The vehicle-mounted security inspection system according to claim 1, wherein the number of the second cabin is two, and in the second state, the two second cabins are respectively located on two opposite sides of the first cabin in the longitudinal direction of the mobile chassis.

5. The vehicle-mounted security inspection system according to claim 1, wherein in the first state, the second cabin is located at a rear end of the first cabin.

6. The vehicle-mounted security inspection system according to claim 5, wherein the human body security inspection apparatus comprises a human body inspection channel located inside the second cabin and a human body security inspection apparatus body located on at least one side of the human body inspection channel, and in the second state, an axial direction of the human body inspection channel is parallel to the longitudinal direction of the mobile chassis.

7. The vehicle-mounted security inspection system according to claim 6, wherein the human body security inspection apparatus comprises an unfolding mechanism configured to achieve a switch of the human body inspection channel between an unfolded state and a compressed state.

8. The vehicle-mounted security inspection system according to claim 6, wherein in the first state, the second cabin is open or has an openable cabin door on a side close to the first cabin, and in the first state, the second cabin has an openable cabin door at a position corresponding to the human body inspection channel on a side away from the first cabin.

9. The vehicle-mounted security inspection system according to claim 1, wherein the object security inspection apparatus comprises an object conveying mechanism configured to convey an inspected object along the longitudinal direction of the mobile chassis.

10. The vehicle-mounted security inspection system according to claim 9, wherein the object conveying mechanism comprises a main body section located inside the first cabin, an inlet extension section and an outlet extension section located outside the first cabin, the inlet extension section is configured to receive the inspected object and transmit the inspected object into an object inspection channel, the main body section is configured to carry the inspected object through the object inspection channel, and the outlet extension section is configured to receive the inspected object from the object inspection channel and transmit the inspected object to a suitable position for the inspected object to be taken away.

11. The vehicle-mounted security inspection system according to claim 10, wherein the object conveying mechanism comprises a mechanical structure configured to achieve a switch, of the inlet extension section and the outlet extension section, between a horizontal position in a working state and a vertical position in a non-working state.

12. The vehicle-mounted security inspection system according to claim 10, wherein the first cabin has an openable cabin door at a position corresponding to the object conveying mechanism at two ends in the longitudinal direction of the mobile chassis.

13. The vehicle-mounted security inspection system according to claim 1, wherein the object security inspection apparatus is a CT security inspector.

14. The vehicle-mounted security inspection system according to claim 1, wherein a towing connection device is provided at a front end of the mobile chassis.

15. The vehicle-mounted security inspection system according to claim 1, further comprising a fixed support device configured to fix and support the mobile chassis at a fixed position.

* * * * *